Sept. 28, 1937.  L. KADAR  2,094,037
RAILWAY BRAKE BEAM
Filed Nov. 2, 1936
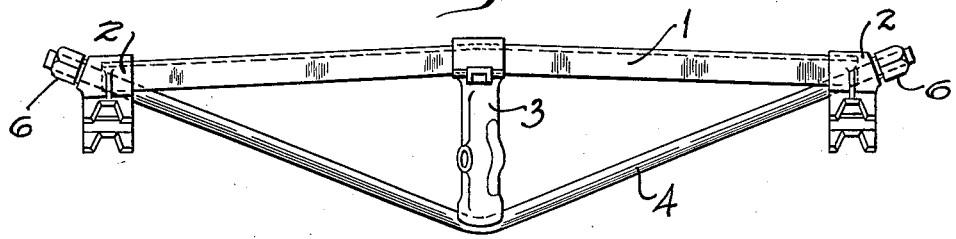
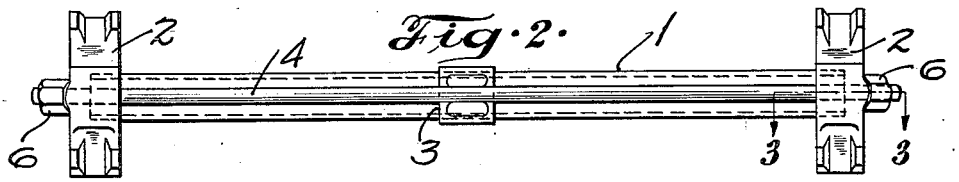
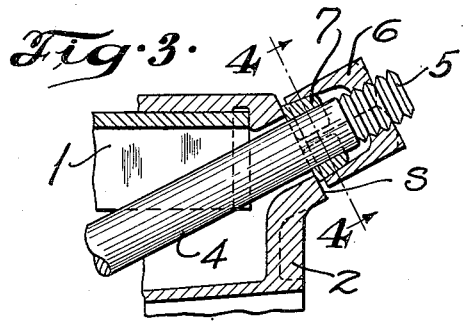
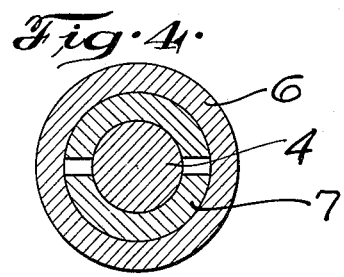
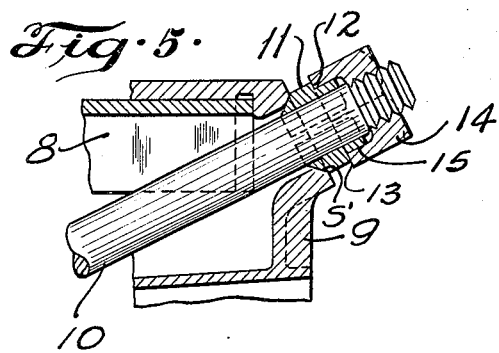
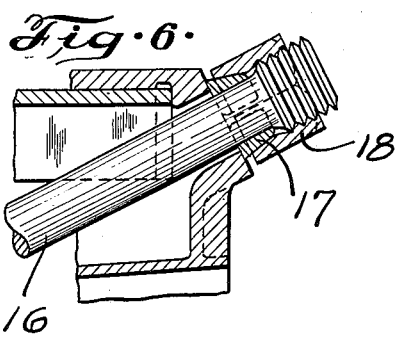
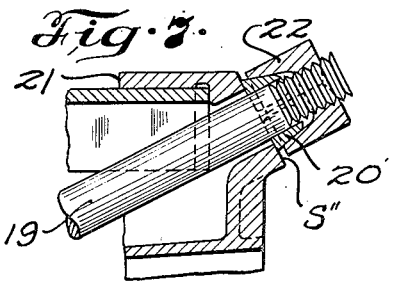
INVENTOR.
Louis Kadar
BY Rodney Bedell
ATTORNEY.

Patented Sept. 28, 1937

2,094,037

UNITED STATES PATENT OFFICE 2,094,037

RAILWAY BRAKE BEAM

Louis Kadar, Chicago, Ill., assignor to Chicago Railway Equipment Company, Chicago, Ill., a corporation of Illinois Application November 2, 1936, Serial No. 108,770

11 Claims. (Cl. 188—226)

The invention relates to railway truss type brake beams in which a tension member has its end portion projecting through a brake head or similar thrust block element, the beam including a device coacting with the tension member and brake head for tensioning the beam.

The usual truss type brake beam with a tensioning nut threaded on the end of the tension rod is subject to breakage near the nut and it has been proposed to upset the end portion of the tension rod so that it may better resist the forces applied thereto and tending to fracture. Upsetting the end of the rod increases the manufacturing cost and sometimes is open to other objections. Also it has been proposed to provide the brake head with an integral cylindrical portion for clamping around the tension rod to resist breakage of the latter. This arrangement calls for a special head construction involving right and left hand heads at opposite ends of the beam and also relies upon bolts disposed transversely of the tension rod for clamping the sleeve about the same and the clamping action of said bolts is not easily maintained.

In my copending application Serial No. 105,497, filed October 14, 1936, I have disclosed a device for applying tension between the end of the tension rod and the brake which includes an exteriorly threaded sleeve anchored to the ends of the tension rod which remains unthreaded throughout its length.

The main object of the present invention is to avoid the breakage of tension rods having threaded ends by reinforcing the rod adjacent its threaded portion with a separate element cooperating with the tensioning device so that as long as there is tension on the rod the element will be actuated to reinforce the tension rod.

An incidental object is to reinforce the rod as suggested and thereby avoid failure of the beam without requiring any special brake beam equipment departing from the usual American Railway Association standards.

In the accompanying drawing illustrating the invention—

Figure 1 is a top view of a truss type brake beam including the rod reinforcing feature.

Figure 2 is a front elevation of the same.

Figure 3 is a detail section drawn to an enlarged scale and taken on the line 3—3 of Figure 2.

Figure 4 is a still further enlarged section taken on the line 4—4 of Figure 3.

Figures 5, 6 and 7 correspond to Figure 3 but illustrate modifications.

In the structure illustrated in Figures 1 to 4, the usual brake beam compression member is indicated at 1 and mounts the brake heads 2 on its ends. A strut 3 at the middle of the beam provides a fulcrum for the brake lever and a tension rod 4 extends over the strut and through the brake heads projecting outwardly beyond the latter and having its end portions threaded as indicated at 5 to receive the tensioning nuts 6.

The outer face of each brake head 2 comprises a seat S lying in a plane extending transversely of the axis of rod 4. Normally the rod tensioning nut is seated against this brake head face, but in the present construction I substitute a ring-like element 7, preferably split so that it may be compressed about the tension rod, and I shape the tensioning nut 6 so that it is constructed to compress element 7 about the rod as the nut is tightened.

As best shown in Figure 3, the outer face of the ring converges outwardly towards the end of the rod and the cooperating portion of the nut is recessed and similarly converged whereby rotation of the nut will not only move the ring against seat S but will contract the ring about the rod so that the ring and nut and the portions of the rod engaged thereby will move as a unit about the brake head. This resists any tendency of the rod to fracture at the base of the threads, which tendency might otherwise result from the repeated application and release of braking forces in the operation of the brake gear.

In Figure 5, the compression member 8, brake head 9 and tension rod 10 are substantially the same as illustrated in Figure 3 but the ring elements 11 have their outer periphery shouldered as at 12 to form a squarely abutting seat for the inner face 13 of nut 14 which includes a substantially cylindrical interior periphery 15 surrounding the narrower portion of the split ring. The seat S' in the brake head and the opposing faces of elements 11 are similarly inclined so that the thrust of nut 14 against the ring elements results in the gripping of the tension rod by the ring elements. Hence the greater the tension on the rod, the stronger the reinforcement. The application of braking forces transversely of the rod will occur at points spaced substantially from the thread grooves.

Figure 6 illustrates structure similar to that shown in Figure 4 but the outer end of rod 16 is substantially upset before threading and the ring 17 encircles the rod nearer to the base of the threads than as shown in Figure 3. The angle of convergence of the exterior of periphery of ring 17 and the interior of periphery of nut 18 is greater than that indicated in Figure 3 whereby the ratio between the tensioning thrust and constricting force is varied.

Figure 7 illustrates a structure similar to that shown in Figure 3 except that the threads on tension rod 19 are extended to a point inwardly of the outer end of the two-part sleeve or thimble 20 but terminate a substantial distance from the thimble seat S" on brake head 21. When nut 22 is tightened, the thimble elements are clamped securely against the unthreaded portion of the rod and serve to transfer transverse forces to this unthreaded portion rather than to the threaded part.

In each form of the invention the rod is anchored to the compression member through its seat on the outer face of the brake head by means of a structure clamping about the periphery of the rod, the clamping being effected by the rod tensioning means whereby the clamping action is intensified when the tensioning device is intentionally tightened, by adjustment of the nut, and when the beam is subjected to additional stress during application of the brakes.

In some forms of truss type brake beams, the brake head is rotatably or otherwise mounted upon a separate element which anchors the tension member and the compression member to each other, and it will be understood that such anchoring or thrust block member may cooperate with the split sleeve and nut in the same manner as the brake head illustrated in the drawing. This and other variations in the structure may be made without departing from the spirit of the invention and I contemplate the exclusive use of such modifications of the structure as come within the scope of the claims.

What is claimed is:

1. In a railway truss type brake beam, a compression member, a brake head mounted thereon, a tension member extending through said brake head, an element surrounding said tension member outwardly of said head and seated thereon, and means for tensioning said tension member mounted on the latter outwardly of said element and engaging the latter to constrict the same about said tension member.

2. In a railway truss type brake beam, a compression member, a brake head mounted thereon, a tension member extending through said brake head, a split ring surrounding said tension member and seated against said head and having its outer periphery converging towards the end of the beam, and a tensioning device mounted on said tension member outwardly of said ring and engaging said ring periphery whereby said device clamps said ring against said tension member as said device applies tension to the beam.

3. In a railway truss type brake beam, a compression member, a brake head mounted thereon, a tension member extending through said brake head, a split ring surrounding said tension member and seated against said head and having its outer periphery converging towards the end of the beam, and a nut threaded on the end of said tension member with its inner face recessed to engage said ring periphery to compress the latter against said tension member as the nut is adjusted to increase the tension of the beam.

4. In a railway truss type brake beam, a compression member, a brake head mounted thereon, a tension member extending through said brake head, a split ring surrounding said tension member and seated against said head and having its outer periphery converging towards the end of the beam, and a nut threaded on the end of said tension member with its inner face recessed and provided with an inner periphery converging similarly to said ring periphery and adapted to fit thereover as said nut is adjusted to tension the beam.

5. In a railway truss type brake beam, a compression member, a brake head thereon, a tension member extending through said brake head free of laterally confining contact therewith, the outer face of said brake head extending transversely of the axis of said tension member, and tensioning means mounted on said tension member and engaging said head face and arranged to grip said tensioning member outwardly of said face.

6. In a railway truss type brake beam, a compression member, a brake head thereon, a tension member extending through said brake head free of laterally confining contact therewith, the outer face of said brake head extending transversely of the axis of said tension member, a split ring seated against said face and encircling said tension member, and a tensioning nut threaded on said tension member and bearing against said ring and constructed and arranged to compress the latter against the periphery of said tension member as the tension thereon is tightened.

7. In a railway truss type brake beam, a tension member having an exteriorly threaded portion for a short distance inwardly from its end and a smooth periphery inwardly of said threaded portion, a sleeve enclosing said smooth periphery adjacent to said threaded portion, and a nut on said threaded portion constructed and arranged to compress said sleeve on said tension member.

8. In a railway truss type brake beam, a compression member, a brake head thereon, a tension rod having a substantially unbroken cylindrical periphery and being of undiminished diameter from its central portion to a point spaced outwardly from said head and being then threaded for a relatively short distance to its end, a nut on the threaded portion of said rod, and a ring-like member between said nut and said head and movable with said nut and rod relative to said head.

9. In a railway truss type brake beam, a compression member, a brake head mounted thereon, a tension member extending through said brake head, a split ring surrounding said tension member and seated against said head and having an outwardly facing shoulder in its outer periphery, and a nut threaded on the end of said tension member with its inner periphery recessed to fit over the shouldered portion of said ring, when the latter closely embraces said tension member, and with its inner face seated against said shoulder.

10. In a railway truss type brake beam, a compression member, a tension member, an anchoring element seated against the end of said compression member and surrounding said tension member, a contractable element seated against the outer face of said anchoring element, and a nut element threaded on the end of said tension member and seated against said contractable element, the interengaging faces of two of said elements converging towards the axis of said tension member whereby tightening of said nut element will contract said contractable element about said tension member.

11. In a railway truss type brake beam, a compression member, a brake head mounted thereon, a tension member extending through said brake head, a split ring surrounding said tension member and seated against said head, and a tensioning device mounted on said tension member outwardly of said ring and seated against the latter, the interengaging faces of said head and ring converging towards the axis of said tension member whereby said device clamps said ring against said tension member as said device applies tension to the beam.

LOUIS KADAR.